United States Patent
Chi et al.

(10) Patent No.: US 8,941,405 B2
(45) Date of Patent: Jan. 27, 2015

(54) FET PAIR BASED PHYSICALLY UNCLONABLE FUNCTION (PUF) CIRCUIT WITH A CONSTANT COMMON MODE VOLTAGE

(75) Inventors: Howard H. Chi, Littleton, MA (US); Haitao O. Dai, Boston, MA (US); Kai D. Feng, Hopewell Junction, NY (US); Donald J. Papae, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 13/566,805

(22) Filed: Aug. 3, 2012

(65) Prior Publication Data
US 2014/0035670 A1    Feb. 6, 2014

(51) Int. Cl.
*H03K 19/00* (2006.01)
*H05K 3/00* (2006.01)

(52) U.S. Cl.
USPC .................................................. 326/8; 380/46

(58) Field of Classification Search
None
See application file for complete search history.

(56) References Cited

U.S. PATENT DOCUMENTS

| | | | |
|---|---|---|---|
| 6,433,579 | B1 | 8/2002 | Wang et al. |
| 7,564,345 | B2 | 7/2009 | Devadas et al. |
| 7,653,197 | B2 | 1/2010 | Van Dijk |
| 7,681,103 | B2 | 3/2010 | Devadas et al. |
| 2003/0122593 | A1* | 7/2003 | Volk .............................. 327/108 |
| 2007/0038871 | A1 | 2/2007 | Kahlman et al. |
| 2007/0090312 | A1 | 4/2007 | Stallinga et al. |
| 2007/0120595 | A1 | 5/2007 | Udupa et al. |
| 2008/0044027 | A1 | 2/2008 | Van Dijk |
| 2008/0231418 | A1 | 9/2008 | Ophey et al. |
| 2008/0279373 | A1 | 11/2008 | Erhart et al. |
| 2009/0083833 | A1 | 3/2009 | Ziola et al. |
| 2009/0146750 | A1 | 6/2009 | Pernia et al. |
| 2009/0153841 | A1 | 6/2009 | Ophey et al. |
| 2010/0014784 | A1 | 1/2010 | Silverbrook et al. |
| 2010/0122353 | A1 | 5/2010 | Koushanfar et al. |
| 2010/0127822 | A1 | 5/2010 | Devadas |
| 2010/0146261 | A1 | 6/2010 | Talstra et al. |
| 2010/0293384 | A1 | 11/2010 | Potkonjak |
| 2010/0293612 | A1 | 11/2010 | Potkonjak |
| 2010/0322418 | A1 | 12/2010 | Potkonjak |
| 2011/0002461 | A1 | 1/2011 | Erhart et al. |
| 2011/0317829 | A1 | 12/2011 | Ficke et al. |
| 2013/0233608 | A1* | 9/2013 | Feng et al. ..................... 174/264 |

OTHER PUBLICATIONS

Anonymous, "Physically Unclonable Function Enhancement to Guarantee Repeatable Behavior", IPCOM000199382D, Aug. 31, 2010, www.ip.com, 5 pages.

(Continued)

*Primary Examiner* — Jany Richardson
(74) *Attorney, Agent, or Firm* — David Cain; Roberts Mlotkowski Safran & Cole, P.C.

(57) ABSTRACT

A FET pair based physically unclonable function (PUF) circuit with a constant common mode voltage and methods of use are disclosed. The circuit includes a first n-type field effect transistor (NFET) and a second NFET. The circuit also includes a first load resistor coupled to the first NFET by a first p-type field effect transistor (PFET) and a second load resistor coupled to the second NFET by a second PFET. The circuit further comprises a closed loop, wherein the closed loop creates a constant common mode voltage.

18 Claims, 7 Drawing Sheets

(56) References Cited

OTHER PUBLICATIONS

Gassend, Blaise, et al., "Controlled Physical Random Functions", The Computer Society, Proceedings of the 18th Annual Computer Society Applications Conference (ACSAC '02), 2002, 12 pages.

Guajardo, Jorge, et al., "Physical Unclonable Functions and Public-Key Crypto for FPGA IP Protection", IEEE, 2007, pp. 189-195.

Lofstrom, Keith W., et al., "IC Identification Circuit using Device Mismatch", 2000 IEEE International Solid-State Circuit Conference, 2000, 2 Pages.

Maeda, Shigenobu, et al., "An Artificial Fingerprint Device (AFD): A Study of Identification Number Applications Utilizing Characteristics Variation of Polycrystalline Silicon TFTs", IEEE Transactions on Electron Devices, vol. 50, No. 6, Jun. 2003, pp. 1451-1458.

Puntin, D., et al., "CMOS Unclonable System for Secure Authentication Based on Device Variability", IEEE, 2008, pp. 130-133.

Su, Y. et al., "A 1.6pJ/bit 96% Stable Chip-ID Generating Circuit using Process Variations", 2007 IEEE International Solid-State Circuits Conference, 2007, pp. 406-407, 611.

* cited by examiner

FET PAIR BASED PHYSICALLY UNCLONABLE FUNCTION (PUF) CIRCUIT WITH A CONSTANT COMMON MODE VOLTAGE

FIELD OF THE INVENTION

The invention relates to semiconductor structures and, more particularly, to a FET pair based physically unclonable function (PUF) circuit with a constant common mode voltage and methods of use.

BACKGROUND

A Physical Unclonabe Function (PUF) is a circuit which generates a set of codes according to physical random performances of hardware devices. PUFs are widely used in data security in the military and commercial applications, e.g., unmanned vehicles, cloud computing, etc. Accordingly, the codes must meet the following two requirements:
(1) The set of codes must be random chip over chip, i.e., even if an exact layout of the chip is reproduced by reverse engineering, the set of codes of the reproduced chip are different from the original chip; and
(2) The set of codes generated by one chip must be constant over time, voltage, temperature, etc.

An example of a PUF is a FET pair PUF. The FET pair PUF includes two identical NFETs to form an NFET pair. Gates of the NFETs are connected together and share a same gate voltage Vg. The NFETs also have a minimum channel width and a channel length, such that they have a maximum mismatch in doping and a threshold voltage variation. In this way, a drain current difference variation, e.g., Ids1−Ids2, of the NFETs is maximized, where Ids1 is a drain current of a first NFET and Ids2 is a drain current of the second NFET.

An operation principle of a FET pair PUF is based on a drain current difference of the FET pair due to threshold variations caused by doping mismatch. More specifically, a sign of the drain current difference determines a circuit character logic value, i.e., an output of the PUF. For example, if the sign of the drain current difference is positive, i.e., Ids1−Ids2>0, the circuit character is logic 1; whereas, if the sign of the drain current difference is negative, i.e., Ids1−Ids2<0, the circuit character is logic 0.

For real systems, a large bit number of the PUF code, e.g., 128 bits, 256 bits, etc., are required. Accordingly, a selectable PUF sensor is built using a pair identical PFETs respectively connected to the NFETs. These PFETs are used as switches, such that when the PFETs are turned on using an enable logic, drains of the NFETs are connected to respective identical load resistors. Conventionally, PUF systems include a controller, a sensor array, a sensor amplifier, and a decision maker. The controller provides the enable logic to the PFETs, and thus turns on a sensor of a sensor array by turning on the PFETs. Also, the controller provides the voltage for the NFET gates.

The load resistors convert the drain currents of the NFETs of the selected sensor to voltages, e.g., $V_R$ and $V_L$, respectively. The sensor logic character values can also be converted based on a difference between these voltages, i.e., a differential voltage $V_R-V_L$. More specifically, if the differential voltage is negative, e.g., $V_R-V_L<0$, the sensor logic character is 1; whereas, if the differential voltage is positive, e.g., $V_R-V_L>0$, the sensor logic character is 0. Thus, the differential voltage represents a randomness of the NFET pairs in the sensor array.

The sensor amplifier is a differential amplifier with differential inputs, e.g., voltages $V_R$ and $V_L$, and a single ended output voltage. Functions of the sensor amplifier include: (i) amplify the differential voltage of the sensor; and (ii) convert the differential input voltages to the single ended output voltage.

The decision maker includes a set of voltage comparators, which compare the sensor amplifier output voltage with preset threshold voltages, and output a logic 1 or logic 0. The output of the voltage comparators must match the logic character of the corresponding sensor. Thus, the sensor amplifier output depends on the sensor differential output voltage. However, problems arise as a result of a transfer function of a differential amplifier used in the sensor amplifier. The transfer function of the differential amplifier is defined by equation (1):

$$Vout = G\_d * Vin\_d + G\_c * Vcom \qquad (1)$$

Where Vout is an output voltage of a differential amplifier, G_d is a differential gain, Vin_d is a differential input voltage, G_c is a common mode gain, and Vcom is a common mode input voltage. More specifically, the problems arise from large variations in the common mode input voltage. For example, the common mode input voltage can have a maximum value of 0.94V, a minimum value of 0.324V, a mean value of 0.532V, and a standard deviation of 0.126V.

However, it has been found that the sensor amplifier cannot handle large variations in the common mode input voltage because the sensor amplifier output voltage is not only determined by the differential input of $V_R-V_L$, but is also impacted by the common mode input voltage. As a result of variations in the common mode input voltage, the decision maker outputs a wrong digital status, i.e., the decision maker output does not match the character value of the sensor.

Accordingly, there exists a need in the art to overcome the deficiencies and limitations described hereinabove.

BRIEF SUMMARY

In an aspect of the invention, a structure comprises a physically unclonable function (PUF) sensor array, and a differential amplifier coupled to the PUF sensor array. The differential amplifier coupled to the PUF sensor array creates a closed loop circuit.

In an aspect of the invention, a circuit comprises a first n-type field effect transistor (NFET) and a second NFET. The circuit also comprises a first load resistor coupled to the first NFET transistor by a first p-type field effect transistor (PFET) transistor and a second load resistor coupled to the second NFET by a second PFET. The circuit further comprises a closed loop, wherein the closed loop creates a constant common mode voltage.

In an aspect of the invention, a method comprises creating a closed loop circuit. The method also comprises driving a common mode voltage to a reference voltage. The method further comprises creating a constant common mode voltage.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of a FET pair based physically unclonable function (PUF) circuit with a constant common mode voltage, which comprises the structures of the present invention. In still further embodiments, a method in a computer-aided design system is provided for generating a functional design model of the FET pair based physically unclonable function (PUF) circuit with a constant common mode voltage. The method comprises generating a functional representation of the structural elements of the FET pair based physically unclonable function (PUF) circuit with a constant common mode voltage.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to semiconductor structures and, more particularly, to a FET pair based physically unclonable function (PUF) circuit with a constant common mode voltage in accordance with aspects of the present invention. In embodiments, a FET pair based physically unclonable function (PUF) circuit with a constant common mode voltage includes a first NFET transistor and a second NFET transistor. The circuit also includes a first load resistor coupled to the first NFET transistor by a first PFET transistor and a second load resistor coupled to the second NFET transistor by a second PFET transistor. The circuit further includes a differential amplifier, wherein the differential amplifier is coupled to a gate voltage or a power supply, forming a closed loop. In this way, the closed loop of the differential amplifier creates a constant common mode voltage. In embodiments, two voltage followers are respectively coupled to the first load resistor of the first NFET and the second load resistor of the second NFET, and two identical resistors connected to a respective output of the voltage followers. That is, the closed loop includes two voltage followers coupled to respective load resistors of the PUF circuit.

More specifically, in embodiments, the outputs of the voltage followers are coupled to each other by two identical resistors and a voltage of a connection node of the two identical resistors is provided to the differential amplifier as a first input, and a reference voltage is provided to the differential amplifier as a second input. Further, in embodiments, the output of the differential amplifier is provided to gates of the plurality of NFET transistors or coupled to a power supply voltage. The power supply voltage is coupled to a drain of the first load resistor and a drain of the second load resistor.

Advantageously, the present invention provides a closed loop to keep the PUF sensor output common mode voltage constant by tuning the gate voltage. Also, advantageously, the present invention provides a closed loop to keep the PUF sensor output common mode voltage constant by tuning the sensor power supply voltage. More specifically, by tuning either the gate voltage or power supply voltage, the present invention provides for a constant common mode voltage. As a result, the present invention eliminates variations in the common mode voltage which cause errors in an output of systems implementing PUF sensors.

Figure 1:
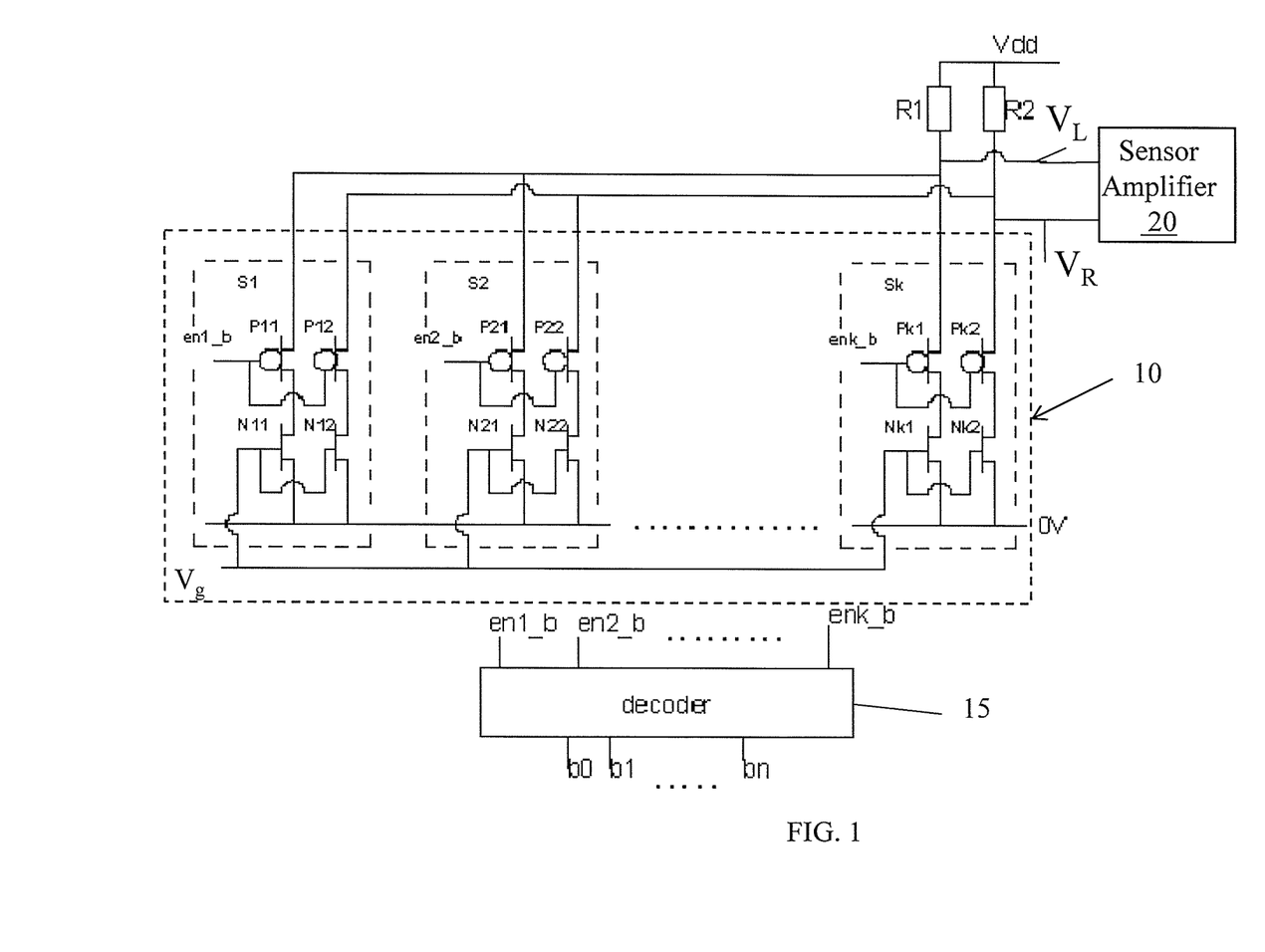
FIG. 1 shows an array of FET pair based PUF sensors in accordance with aspects of the present invention.

FIG. 1 shows a PUF sensor array in accordance with aspects of the present invention. More specifically, FIG. 1 shows a plurality of PUF sensors $S_1, S_2, \ldots S_k$, which form a sensor array 10. Although the sensor array 10 of FIG. 1 is shown with three PUF sensors, it should be understood by those of ordinary skill in the art that the present invention may be implemented with any number of PUF sensors, i.e., k number of sensors.

In embodiments, the PUF sensors $S_1, S_2, \ldots S_k$ each include a pair of NFET transistors, which are identical in size. For example, the PUF sensor $S_1$ includes NFET transistors $N_{11}, N_{12}$, the PUF sensor $S_2$ includes NFET transistors $N_{21}, N_{22}$, the PUF sensor $S_k$ includes NFET transistors $N_{k1}, N_{k2}$, etc. In embodiments, gates of the NFET transistors are connected together. More specifically, as shown in FIG. 1, a gate voltage $V_g$ is coupled to the gates of the NFET transistors $N_{11}, N_{12}$ of the PUF sensor $S_1$, gates of the NFET transistors $N_{21}, N_{22}$ of the PUF sensor $S_2$, gates of the NFET transistors $N_{k1}, N_{k2}$ of the PUF sensor $S_k$, etc. Alternatively, the gates the NFET transistors, e.g., $N_{k1}, N_{k2}$, may be coupled to a closed loop for a constant common mode voltage. A source of the NFET transistors, e.g., $N_{k1}, N_{k2}$, is coupled to ground, e.g., 0V.

Further, the PUF sensors $S_1, S_2, \ldots S_k$ include a pair of PFET transistors coupled to the pair of NFET transistors. For example, PFET transistors $P_{11}, P_{12}$ of the PUF sensor $S_1$ are coupled to the NFET transistors $N_{11}, N_{12}$, respectively, PFET transistors $P_{21}, P_{22}$ of the PUF sensor $S_2$ are coupled to the NFET transistors $N_{21}, N_{22}$, respectively, PFET transistors $P_{k1}, P_{k2}$ of the PUF sensor $S_k$ are coupled to the NFET transistors $N_{k1}, N_{k2}$, respectively, etc.

In embodiments, the PFET transistors, e.g., PFET transistors $P_{k1}, P_{k2}$ function as switches. More specifically, an enable gate voltage is applied to gates of the PFET transistors. For example, the enable gate voltage en1_b is provided to PFET transistors $P_{11}, P_{12}$, the enable gate voltage en2_b is provided to PFET transistors $P_{21}, P_{22}$, the enable gate voltage enk_b is provided to PFET transistors $P_{k1}, P_{k2}$, etc. In this way, the enable gate voltage turns the respective PUF sensors on and off, e.g., the enable gate voltage enk_b turns PUF sensor $S_k$ on and off. The enable gate voltage, e.g., the enable gate voltage enk_b, is determined using a decoder 15.

More specifically, bits b0, b1, . . . bn are provided to the decoder 15, which converts the bits b0, b1, . . . bn into the enable gate voltages en1_b, en2_b, and enk_b, respectively. In embodiments, when the enable gate voltage, e.g., enable gate voltage enk_b, is a logic low, the respective PUF sensor, e.g., PUF sensor $S_k$, is turned on, and as a result, drains of the NFET transistors of the respective PUF sensor, e.g., NFET transistors $N_{k1}, N_{k2}$, are connected to identical load resistors R1 and R2, respectively, by the PFET transistors of the respective PUF sensor, e.g., PFET transistors $P_{k1}$, $P_{k2}$. On the other hand, when the enable gate voltage, e.g., enable gate voltage enk_b, is a logic high, the respective PUF sensor, e.g., PUF sensor $S_k$, is turned off.

In embodiments, when the PUF sensors $S_1$, $S_2$, ... $S_k$ are turned on, the resistors R1, R2 convert drain currents of the NFET transistors, e.g., NFET transistors $N_{k1}$, $N_{k2}$ of the PUF sensor $S_k$, to voltages $V_R$, $V_L$, which are outputs of the sensor array 10 and are provided to a sensor amplifier 20. The resistors R1, R2 are also coupled to a power supply voltage Vdd.

Figure 2:
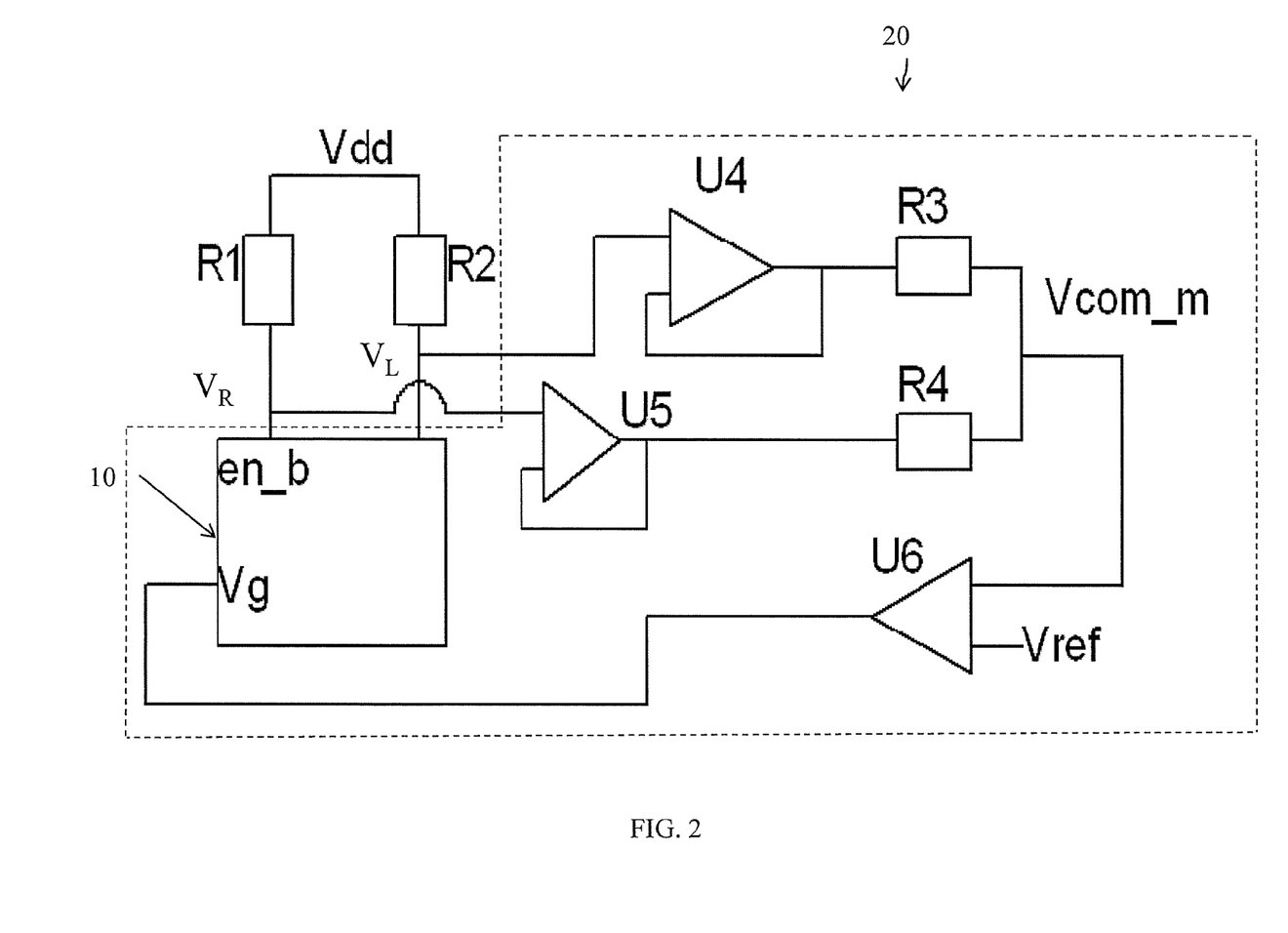
FIG. 2 shows a FET pair based physically unclonable function (PUF) circuit with a closed loop to form a constant common mode voltage by tuning a gate voltage in accordance with aspects of the present invention.

FIG. 2 shows a FET pair based physically unclonable function (PUF) circuit with a constant common mode voltage in accordance with aspects of the present invention. More specifically, FIG. 2 shows a closed loop to set the common mode voltage to a predefined value by tuning the gate voltage Vg of the sensor array 10 of FIG. 1. In embodiments, the closed loop 20 includes voltage followers U4, U5. The voltages $V_R$, $V_L$ are provided to inputs of the voltage followers U4, U5, respectively. Additionally, an output of the voltage followers U4, U5 is provided back to a respective voltage follower U4, U5 as a second input. Further, in embodiments, the outputs of the voltage followers U4, U5 are provided to resistors R3, R4, respectively. In embodiments, the resistors R3, R4 are identical resistors, such that a voltage at a connection point of the resistors R3, R4 is a common mode voltage Vcom_m. In this way, in embodiments, the common mode voltage Vcom_m is $(V_L+V_R)/2$.

In embodiments, the closed loop 20 also includes a differential amplifier U6. More specifically, in embodiments, the common mode voltage Vcom_m is provided to the differential amplifier U6 as a first input and a predefined voltage Vref is provided to the differential amplifier U6 as a second input. In embodiments, the differential amplifier U6 provides for a very high gain, and as a result, the voltage Vcom_m is driven to the predefined voltage Vref by the closed loop as should be understood by those of ordinary skill in the art. More specifically, in embodiments, the output of the differential amplifier U6 is driven by the predefined voltage Vref. In embodiments, the output of the differential amplifier U6 is connected to the gate voltage Vg. In this way, a negative closed loop is formed, which forces the common mode voltage Vcom_m of a selected PUF sensor, e.g., PUF sensor $S_k$ of FIG. 1, of the PUF sensor array 10 to the predefined voltage Vref.

Figure 3:
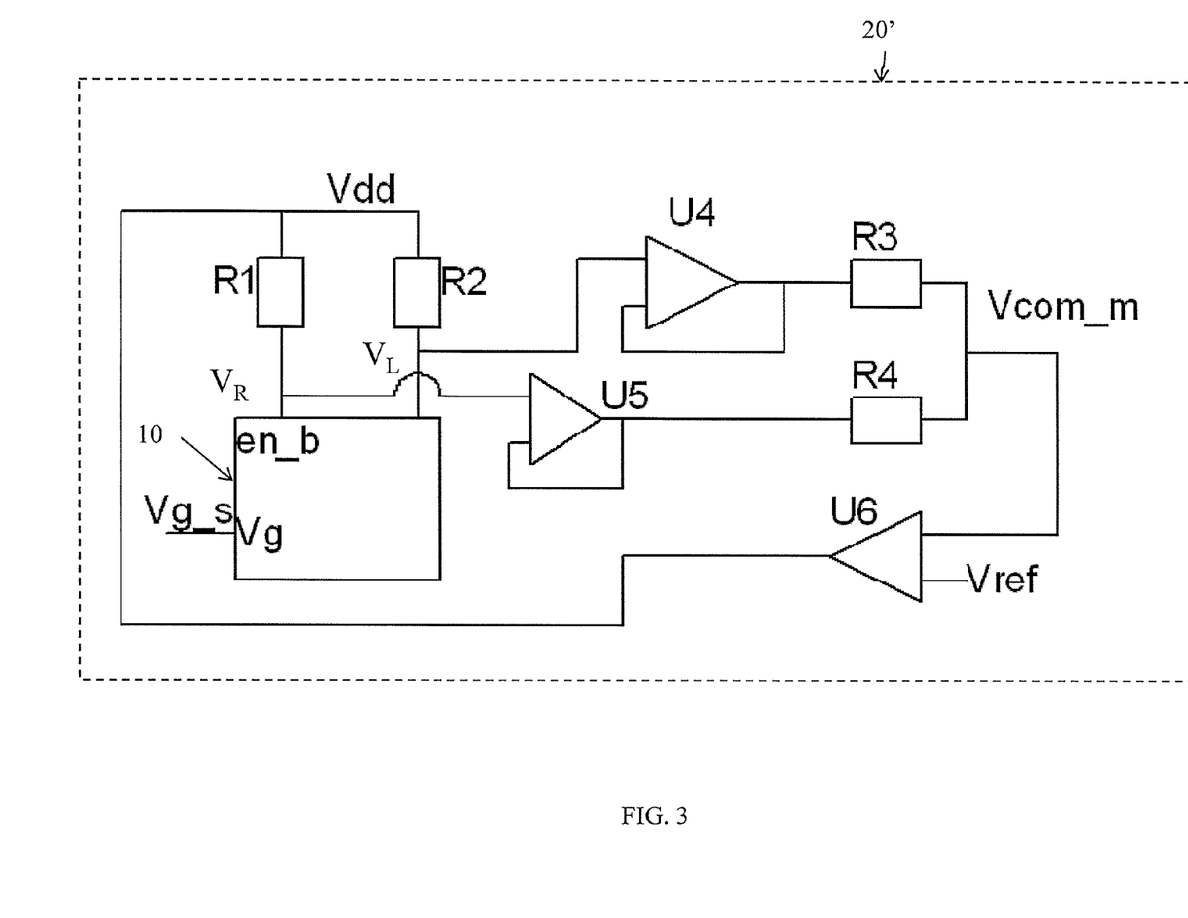
FIG. 3 shows an FET pair based physically unclonable function (PUF) circuit with an alternate closed loop to form a constant common mode voltage by tuning a power supply voltage in accordance with aspects of the present invention.

FIG. 3 shows an alternate a FET pair based physically unclonable function (PUF) circuit with a constant common mode voltage in accordance with aspects of the present invention. More specifically, in comparison to FIG. 2, an output of the differential amplifier U6 is coupled to the power supply voltage Vdd, and the gate voltage $V_g$ is coupled to a conventional gate voltage $V_{g\_s}$. In this way, FIG. 3 shows a closed loop to set the common mode voltage Vcom_m to the predefined value by tuning the power supply voltage Vdd. The remaining structure of FIG. 3 is the same as the structure shown in FIG. 2.

More specifically, in embodiments, the closed loop 20' includes voltage followers U4, U5. The voltages $V_R$, $V_L$ are provided to inputs of the voltage followers U4, U5, respectively. Additionally, an output of the voltage followers U4, U5 is provided back to a respective voltage follower U4, U5 as a second input. Further, in embodiments, the outputs of the voltage followers U4, U5 are provided to resistors R3, R4, respectively. In embodiments, the resistors R3, R4 are identical resistors, such that the voltage at a connection point of the resistors R3, R4 is a common mode voltage Vcom_m. In this way, the common mode voltage Vcom_m is $(V_L+V_R)/2$.

In embodiments, the closed loop 20' also includes a differential amplifier U6. More specifically, in embodiments, the common mode voltage Vcom_m is provided to the differential amplifier U6 as a first input and a predefined voltage Vref is provided to the differential amplifier U6 as a second input. In embodiments, the differential amplifier U6 provides for a very high gain, and as a result, the voltage Vcom_m is driven to the predefined voltage Vref through the closed loop as should be understood by those of ordinary skill in the art. More specifically, in embodiments, the output of the differential amplifier U6 is driven by the predefined voltage Vref. In embodiments, the output of the differential amplifier U6 is connected to the power supply voltage Vdd. In this way, a negative closed loop is formed, which forces the common mode voltage Vcom_m of a selected PUF sensor, e.g., PUF sensor $S_k$ of FIG. 1, of the PUF sensor array 10 to the predefined voltage Vref.

Figure 4:
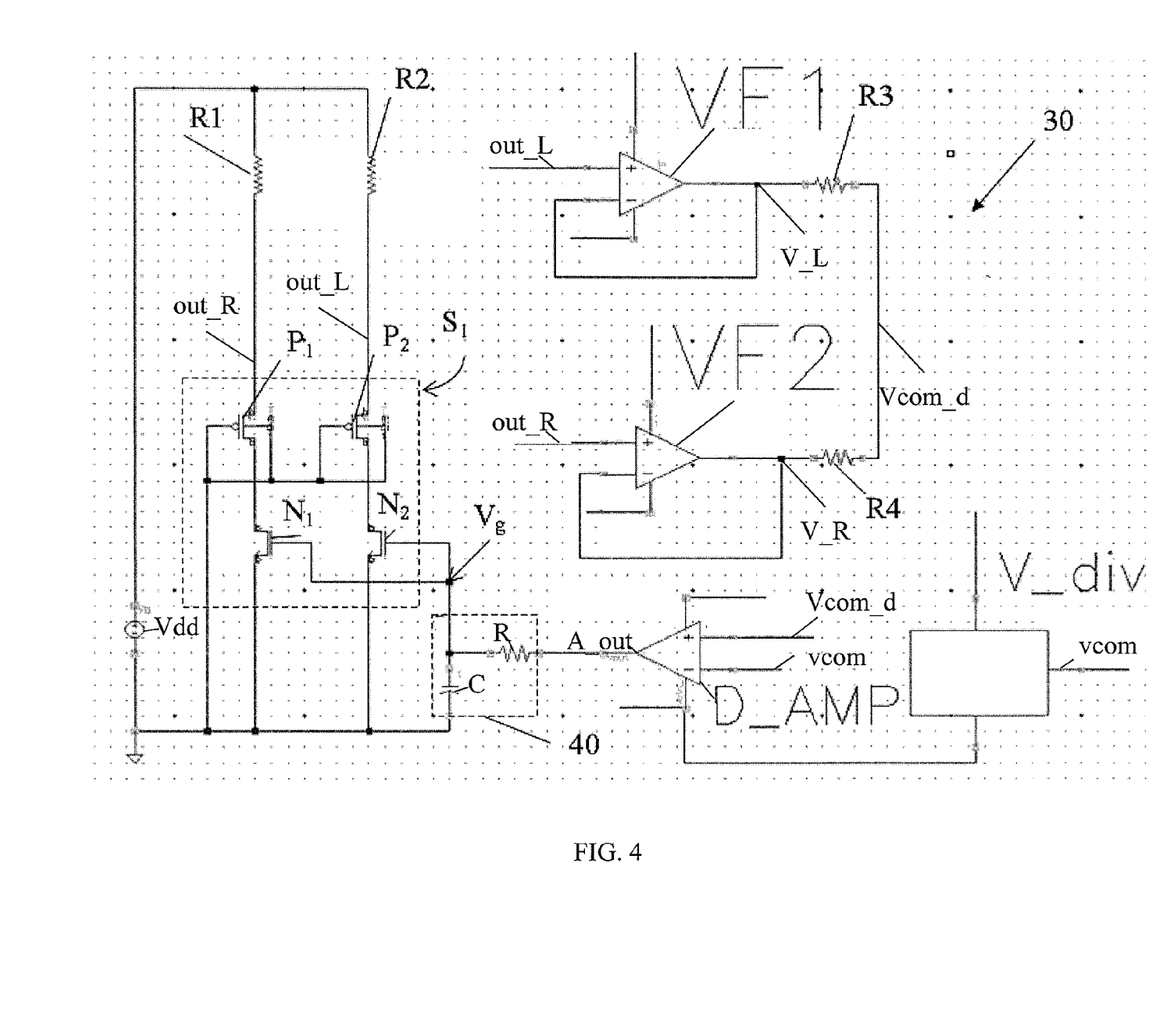
FIG. 4 shows a layout of a simulation schematic of a FET pair based physically unclonable function (PUF) circuit with a constant common mode voltage in accordance with aspects of the present invention.

FIG. 4 shows a layout of a simulation schematic of a FET pair based physically unclonable function (PUF) circuit with a constant common mode voltage in accordance with aspects of the present invention. More specifically, the schematic 30 includes a PUF sensor $S_1$ having a pair of NFET transistors $N_1$, $N_2$. In embodiments, the schematic also includes a gate voltage $V_g$ coupled to the gates of the NFET transistors $N_1$, $N_2$ of the PUF sensor $S_1$. Further, the PUF sensor $S_1$ includes a pair of PFET transistors $P_1$, $P_2$ coupled to a respective one of the NFET transistors $N_1$, $N_2$. In embodiments, drains of NFET transistors $N_1$, $N_2$ are connected to load resistors R1 and R2, respectively, by the PFET transistors $P_1$, $P_2$. The resistors R1, R2 are also coupled to a power supply voltage Vdd.

As further shown in FIG. 4, outputs out_L, out_R of the NFET transistors $N_1$, $N_2$, respectively, are provided to voltage followers VF1, VF2, respectively. An output V_L, V_R of the respective voltage followers VF1, VF2 is provided back to a respective voltage follower VF1, VF2 as a second input. Additionally, the outputs V_L, V_R are provided to resistors R3, R4, respectively. The resistors R3, R4 are identical resistors, such that the voltage at a connection point of the resistors R3, R4 is a common mode voltage Vcom_d. In this way, in embodiments, the common mode voltage is $(V_L+V_R)/2$.

In FIG. 4, the common mode voltage Vcom_d and a reference voltage vcom are provided to a differential amplifier D_AMP as inputs. In embodiments, the differential amplifier D_AMP provides for a very high gain, and as a result, voltage Vcom_d is driven to the reference voltage vcom through the closed loop. Further, as shown in FIG. 4, an output A_out of the differential amplifier D_AMP is connected to a gate of the NFET transistors $N_1$, $N_2$ through an RC filter 40 which provides for closed loop stability. In this way, a negative closed loop is formed, which forces the common mode voltage Vcom_d to the reference voltage vcom.

Figure 5A:
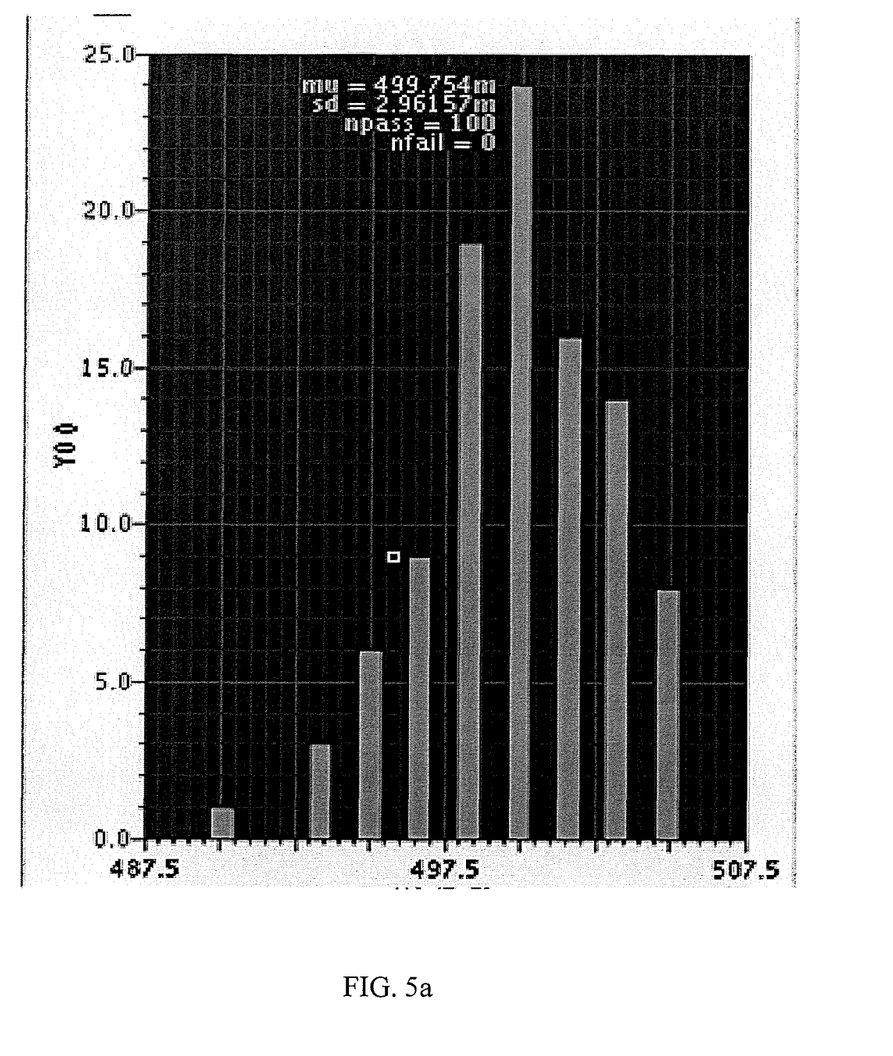
FIG. 5a shows a graph of Monte Carlo simulation results of a common mode voltage variation of the simulation schematic with the closed loop for the constant common mode voltage in accordance with aspects of the present invention.

FIG. 5a shows a graph of simulation results of the simulation schematic in accordance with aspects of the present invention. More specifically, 100 monte carlo simulations were conducted using the schematic 30 of FIG. 4. In the simulations, a 1V power supply voltage, e.g., Vdd, was used, and an expected common mode voltage was 0.5V. During the simulations, the gate voltage, e.g., $V_g$, was tuned from about 275 mV to about 450 mV. As a result, the common mode voltage had a maximum voltage 0.504V, a minimum voltage of 0.490V, a mean value of 0.4998V, and a standard deviation of 0.003 V.

Figure 5B:
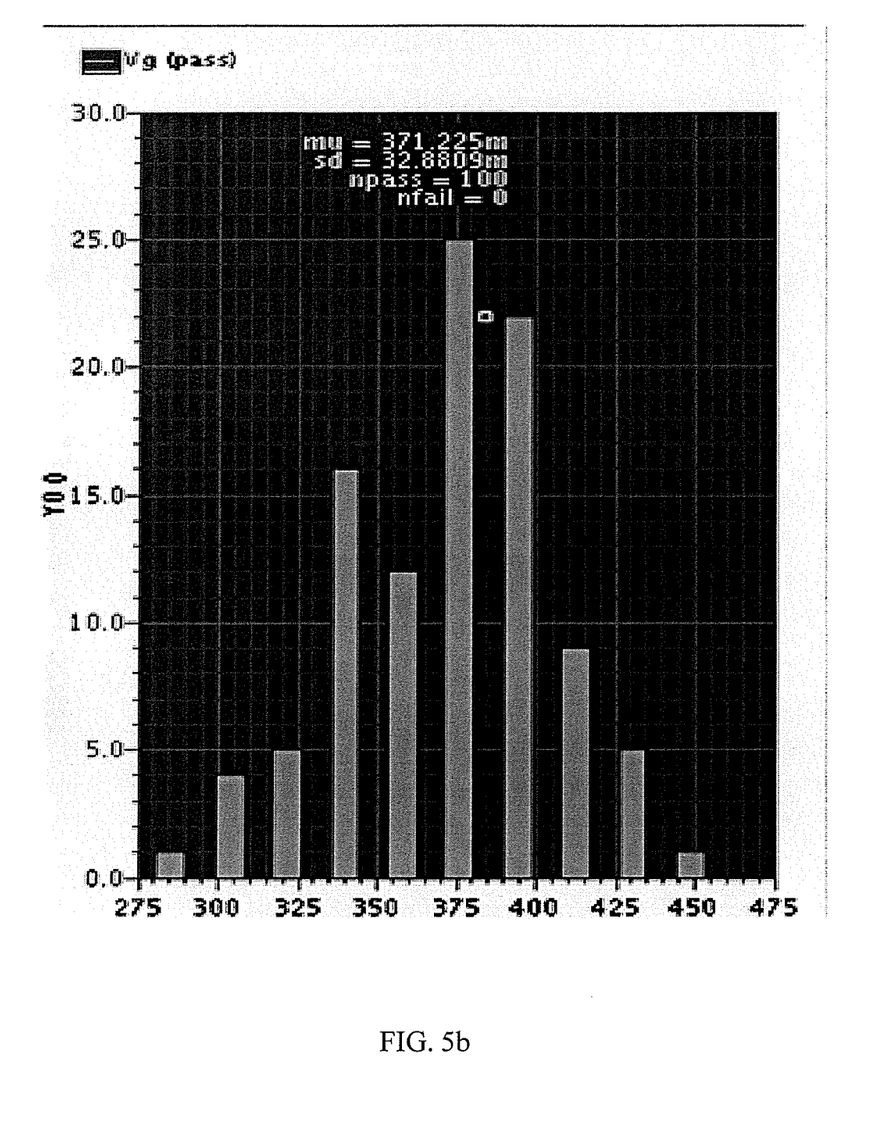
FIG. 5b shows a graph of Monte Carlo simulation results of a of the gate voltage of FET pair based PUF with the closed loop for the constant common mode voltage in accordance with aspects of the present invention.

FIG. 5b shows Monte Carlo simulation results of the gate voltage Vg range in the closed loop. More specifically, as shown in FIG. 5b, the gate voltage had a maximum voltage of 450 mV, a minimum voltage of 275 mV, a mean voltage of 371 mV, and a standard deviation of 32.9 mV. Thus, the present invention advantageously eliminates large variations in the common mode voltage in a reasonable gate voltage tuning range for the power supply voltage of 1V.

Figure 6:
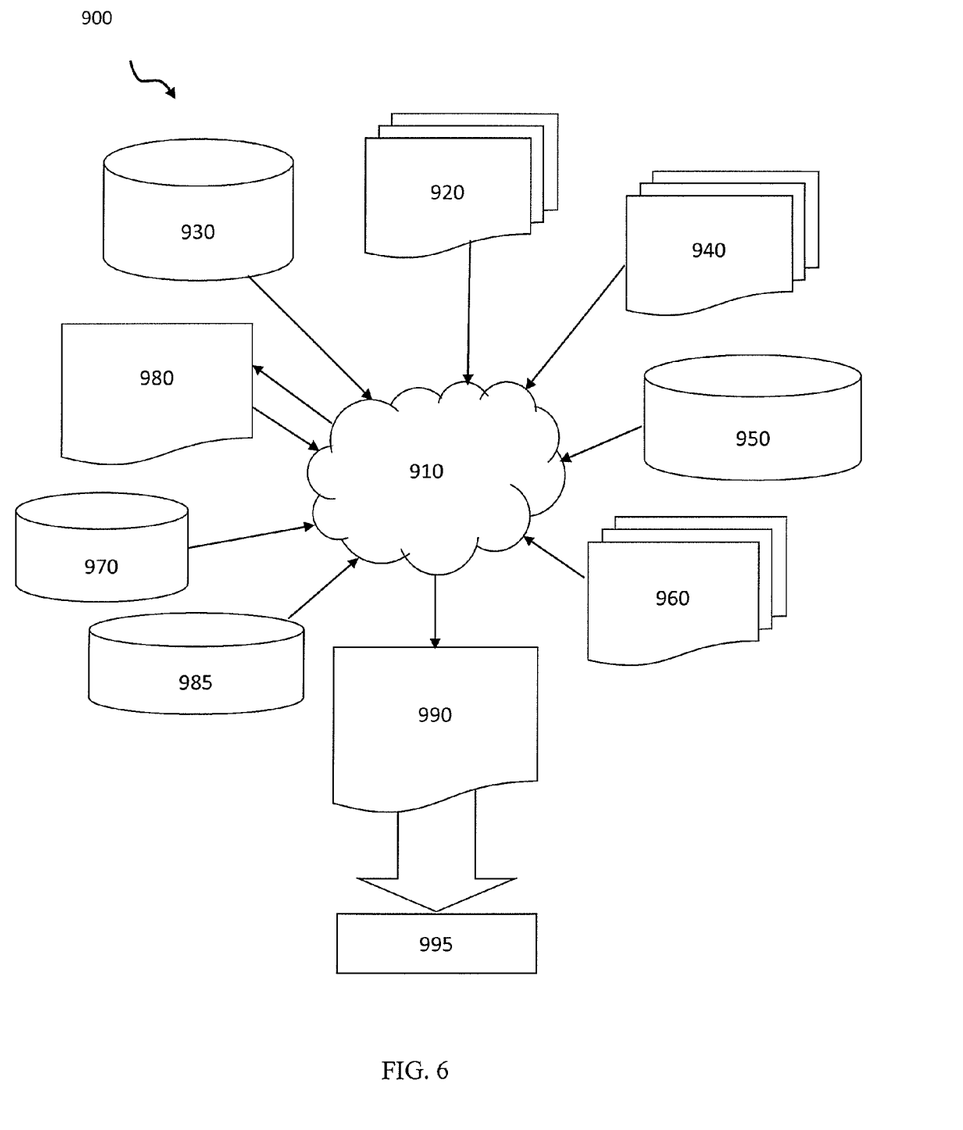
FIG. 6 is a flow diagram of a design process used in semiconductor design, manufacture, and/or test.

FIG. 6 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-4. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-4 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-4. In one embodiment, design structure 990 may comprise a compiled, executable HDL simulation model that functionally simulates the devices shown in FIGS. 1-4.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-4. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure, comprising:
a physically unclonable function (PUF) sensor array; and
a differential amplifier coupled to the PUF sensor array,
wherein the differential amplifier coupled to the PUF sensor array creates a closed loop circuit; and
wherein the closed loop comprises the differential amplifier coupled to a connection point of a plurality of resistors, and the plurality of resistors are coupled to each other such that the connection point of the plurality of resistors form a common mode voltage.

2. The structure of claim 1, wherein the closed loop circuit further comprises:
a plurality of voltage followers coupled to the PUF sensor array; and
the plurality of resistors connected to a respective output of the plurality of voltage followers.

3. The structure of claim 2, wherein:
the common mode voltage and a reference voltage are provided to the differential amplifier as inputs; and
an output of the differential amplifier is provided as a gate voltage or a power supply voltage of the PUF sensor array.

4. The structure of claim 3, wherein the output of the differential amplifier is provided to one or more gates of the PUF sensor array.

5. The structure of claim 4, wherein the output of the differential amplifier tunes a gate voltage of the PUF sensor array, such that the PUF sensor array has a constant common mode voltage.

6. The structure of claim 5, wherein the tuned gate voltage reduces a standard deviation of the constant common mode voltage.

7. The structure of claim 5, wherein the standard deviation is 0.003 volts.

8. The structure of claim 3, wherein the output of the differential amplifier is coupled to the power supply voltage connected to the PUF sensor array.

9. The structure of claim 8, wherein the output of the differential amplifier tunes the power supply voltage, such that the PUF sensor array has a constant common mode voltage.

10. A structure, comprising:
a physically unclonable function (PUF) sensor array, wherein the PUF sensor array has a constant common mode voltage, which reduces voltage variations and improves reliability of an output of the PUF sensor array; and
a differential amplifier coupled to the PUF sensor array, wherein the differential amplifier coupled to the PUF sensor array creates a closed loop circuit.

11. A circuit, comprising:
a first n-type field effect transistor (NFET);
a second NFET;
a first load resistor coupled to the first NFET by a first p-type field effect transistor (PFET);
a second load resistor coupled to the second NFET by a second PFET; and
a closed loop,
wherein the closed loop creates a constant common mode voltage; and
wherein the closed loop comprises:
a plurality of voltage followers respectively coupled to a drain of the first NFET by the first PFET and a drain of the second NFET by the second PFET; and
a plurality of resistors connected to a respective output of the plurality of voltage followers, wherein:
a connection of the plurality of resistors are coupled to each other and is provided to the differential amplifier as a first input; and
a reference voltage is provided to the differential amplifier as a second input.

12. The circuit of claim 11, wherein the constant common mode voltage is driven to the reference voltage.

13. The circuit of claim 12, wherein the output of the differential amplifier is provided to a gate of the first NFET and a gate of the second NFET.

14. The circuit of claim 12, wherein:
the output of the differential amplifier is coupled to a power supply voltage; and
the power supply voltage is coupled to the first load resistor and the second load resistor.

15. A method, comprising:
creating a closed loop circuit;
driving a common mode voltage to a reference voltage; and
creating a constant common mode voltage,
wherein creating the constant common mode voltage reduces common mode voltage variations and improves reliability of an output of a physically unclonable function (PUF) sensor.

16. The method of claim 15, wherein creating the closed loop circuit comprises providing an output of a differential amplifier as a gate voltage to a plurality of transistors or coupling the output of the differential amplifier to a power supply voltage.

17. The method of claim 16, wherein creating the constant common mode voltage comprises tuning the gate voltage.

18. The method of claim 16, wherein creating the constant common mode voltage comprising tuning the power supply voltage.

* * * * *